J. R. BROWN & W. A. FOSKET,

Assignors to the PROVIDENCE STEAM & GAS PIPE CO.

Automatic Fire-Extinguisher.

No. 8,812. Reissued July 15, 1879.

WITNESSES:

William L. Roof

Joseph A. Miller Jr.

INVENTOR:

Joseph R. Brown

Wm. A. Foskett by Joseph A. Miller Attorney

UNITED STATES PATENT OFFICE.

JOSEPH R. BROWN AND WILLIAM A. FOSKETT, OF NEW HAVEN, CONN., ASSIGNORS TO THE PROVIDENCE STEAM AND GAS PIPE COMPANY.

IMPROVEMENT IN AUTOMATIC FIRE-EXTINGUISHERS.

Specification forming part of Letters Patent No. 166,451, dated August 10, 1875; Reissue No. 8,812, dated July 15, 1879; application filed April 21, 1879.

*To all whom it may concern:*

Be it known that we, JOSEPH R. BROWN and WILLIAM A. FOSKETT, both of the city and county of New Haven, State of Connecticut, have invented a new and useful Improvement in Automatic Fire-Extinguishers; and we hereby declare that the following is a full, clear, and exact description of the invention, which will enable others skilled in the art to which it appertains to make and use the same, reference being had to the accompanying drawings, forming part of this specification.

Figure 1:
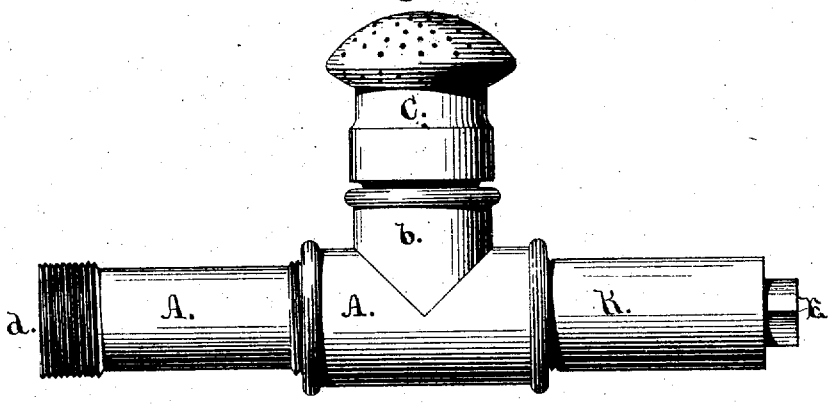
Figure 2:
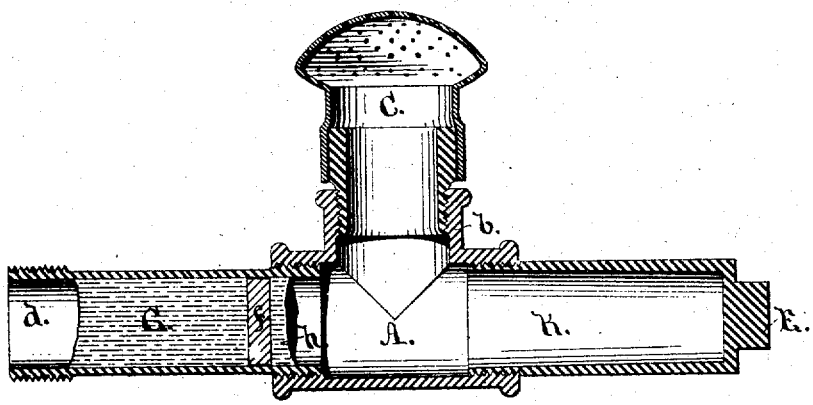

Figure 1 is a perspective view, showing the device and the arrangement of the rose-sprinkler or distributer on the same. Fig. 2 is a section of the same, showing the interior of the device and the means by which the water duct or passage is closed.

This invention has reference to that class of fire-extinguishers in which the heat of a fire, by raising the temperature of the apartment above the normal or any fixed temperature, automatically lets on the water to that part of the apartment or building, and thus extinguishes the fire.

The object of this invention is to insure the prompt action of the apparatus by allowing the water to flow through the sprinkler as soon as the temperature reaches the fixed point.

Another object of the invention is to prevent the accumulation of the impurities contained in water liable to precipitate and form cement, and thus prevent the free release of the water when the temperature is raised by fire.

Still another object of the invention is to prevent the water in the pipes reaching the soldered joints, and thus absorb the heat and delay the action of the extinguisher.

The nature of this invention consists in placing a plug within the apparatus, held in place by a suitable solder, and protected by a core of a substance which is a poor conduc or of heat, as is more fully set forth hereinafter.

In the drawings, A is a cylindrical pipe, having a screw-socket at each end and a branch at *b*, to which the sprinkler C is secured. One end of the pipe A is secured to the supply-pipe *d*, and the other is closed by the plug E.

*f* is a metal disk, fitting loosely into the pipe A. Around the edge of the disk suitable solder is placed, and when the pipe A is heated to the melting-point of the solder and allowed to cool the disk will be firmly fixed and retained in the pipe A until it is again heated to the melting-point of the solder. After the disk *f* is thus secured the core G is placed into the pipe, and forced so as to fill up the pipe in front of the disk, as shown in Fig. 2.

The core G is made of material which, being a poor conductor of heat, will melt at, or nearly at, the temperature at which the solder on the disk melts.

In ordinary rooms or manufacturing establishments a temperature exceeding 120° Fahrenheit would indicate a fire. In such places stearine, paraffine, or wax may be used for the core, whereas in drying-kilns, ovens, or rooms in which a higher temperature is maintained the core G, as well as the solder by which the disk *f* is secured, must be composed of such material as will only melt when the temperature is raised sufficiently above the normal temperature to indicate that a fire has broken out, and thus at once automatically put the extinguisher into operation.

That part of the pipe A between the disk *f* and the plug E is of slightly larger diameter than the rest, thus forming the pocket K. When, now, the heat generated by the fire softens the outside of the core G and melts the solder on the edge of the disk *f*, the water-pressure forces the disk and core into the box K, and allows a free flow of the water to the sprinkler C, by which it is thrown in a fine spray on the fire automatically, and at such points only where the rise in temperature indicates that the fire exists.

When in an automatic fire-extinguisher in which the melting of solder releases a cap, valve, or disk, the water comes in contact with the disk, valve, or cap, the impurities in the water—such as lime or other earthy matter, or metallic oxides—in the course of time form a solid and strong cement, firmly cementing the valve, disk, or cap to its seat, and when a fire breaks out in a building provided with such fire-extinguishers the apparent security engendered by the certainty of the action of the apparatus, when first put up, is liable to cause the most disastrous consequences, and this is almost certain to happen in the course of time.

To prevent this action of the water on the disk, we place the core G between the water and the disk *f*, and also cover the other side of the disk with the same composition, as is shown in broken lines at *h*, and in all cases where paraffine or wax can be used we prefer them, as they are not liable to change; but do not confine ourselves to any particular substance, selecting such material as will not change or melt until the dangerous temperature is reached.

The apparatus thus arranged, with the core G between the water and that part of the device in which the solder is to be melted by heat only a few degrees above the highest temperature possible without a fire, is more reliable than when water can come in contact with the part to be so heated, as in the latter case the water must be also heated to the temperature required to melt the solder, and thus the most valuable time, when the fire is small, is lost.

Having thus described our invention, we claim as new and desire to secure by Letters Patent—

1. In an automatic fire-extinguisher, a device interposed between the supply and discharge openings of the extinguisher, said device retained in place by fusible solder and a core or body of wax, paraffine, or equivalent substance located between the water-supply and device heretofore specified, substantially as set forth.

2. In an automatic fire-extinguisher, the combination, with the supply-pipe, of the disk *f*, secured within the pipe by solder, substantially as and for the purpose set forth.

3. The combination in a fire-extinguisher, of the supply-pipe and a disk secured within the pipe with fusible solder, of a pocket or receptacle arranged to receive the disk when unsoldered, as and for the purpose described.

4. The disk *f*, secured within the pipe A by fusible solder, and covered with paraffine, wax, or their equivalent, substantially as and for the purpose specified.

5. The core G, consisting of fusible material placed between the water and the disk, secured by solder, substantially as and for the purpose described.

6. The combination of the core G, the disk *f*, and the pocket K, for receiving the core and disk, and allowing a free passage for the water.

7. The combination in an automatic fire-extinguisher, of the supply-pipe and a distributor, a disk secured in the pipe and arranged so as to be released by the action of heat, substantially as and for the purpose set forth.

JOSEPH R. BROWN.
WM. A. FOSKETT.

Witness to signature of J. R. Brown:
JAMES D. S. BROWN.

Witness to signature of Wm. A. Foskett:
N. P. BISHOP, Jr.

Witness to both:
JOHN F. BISHOP.